United States Patent [19]

Fechner et al.

[11] Patent Number: 4,664,741

[45] Date of Patent: May 12, 1987

[54] APPARATUS FOR AUTOMATICALLY APPLYING AND PRESSING WEBS OF RUBBER OR SIMILAR LINING MATERIAL TO AND AGAINST EXPANDED WALL SURFACES

[75] Inventors: Gerald Fechner, Seesen; Rolf Meyer; Gerhard Porrmann, both of Bockenem, all of Fed. Rep. of Germany

[73] Assignee: Haw Harzer Apparatewerke KG, Schwemann & Althoff, Seesen, Fed. Rep. of Germany

[21] Appl. No.: 744,135

[22] Filed: Jun. 12, 1985

[30] Foreign Application Priority Data

Jun. 14, 1984 [DE] Fed. Rep. of Germany ....... 3422116

[51] Int. Cl.⁴ .............................................. B44C 7/06
[52] U.S. Cl. .................................... 156/574; 156/391; 156/523; 156/526; 156/527; 156/577
[58] Field of Search .............. 156/391, 523, 526, 574, 156/575, 577, 527; 29/110, 116 R, 121.1, 130

[56] References Cited

U.S. PATENT DOCUMENTS

| | | | |
|---|---|---|---|
| 3,404,058 | 10/1968 | Fink | 156/527 |
| 3,960,643 | 6/1976 | Dargitz et al. | 156/526 |
| 4,075,053 | 2/1978 | Adams | 156/577 |
| 4,208,238 | 6/1980 | August et al. | 156/523 |
| 4,461,669 | 7/1984 | Dontscheff | 156/574 |

FOREIGN PATENT DOCUMENTS 935319 6/1982 U.S.S.R. ............................. 156/574

Primary Examiner—Caleb Weston
Attorney, Agent, or Firm—Karl F. Ross; Herbert Dubno

[57] ABSTRACT

An automatically operating apparatus is disclosed for applying webs of rubber or similar lining material of predetermined width and length to expanded surfaces of walls of steel in vessels, reactors or apparatus and for pressing said webs thereagainst, with said apparatus comprising a guide frame for a drivable carriage and with said guide frame being easily mountable to follow surfaces of different lengths. Mounted on said carriage is an unwinding means for the web material as well as a drivable position and press head adapted to be moved in the longitudinal direction of said carriage. The assembly is such that during operation, said press head is caused to steadily move along a zick-zack path and, in the course of unrolling said web material from the supply reel, said head positions said web portion against the surface to be lined progressively from left to right and from right to left and presses said web portion thereagainst at a constant predetermined pressure. By means of devices mounted on said carriage, application of the webs is accomplished simultaneously with the formation of a seam overlapping with the previously applied web and finishing treatment of this overlap seam and the preparation of the next overlap seam, which means, obliquely cutting the open longitudinal edge of the web.

11 Claims, 9 Drawing Figures

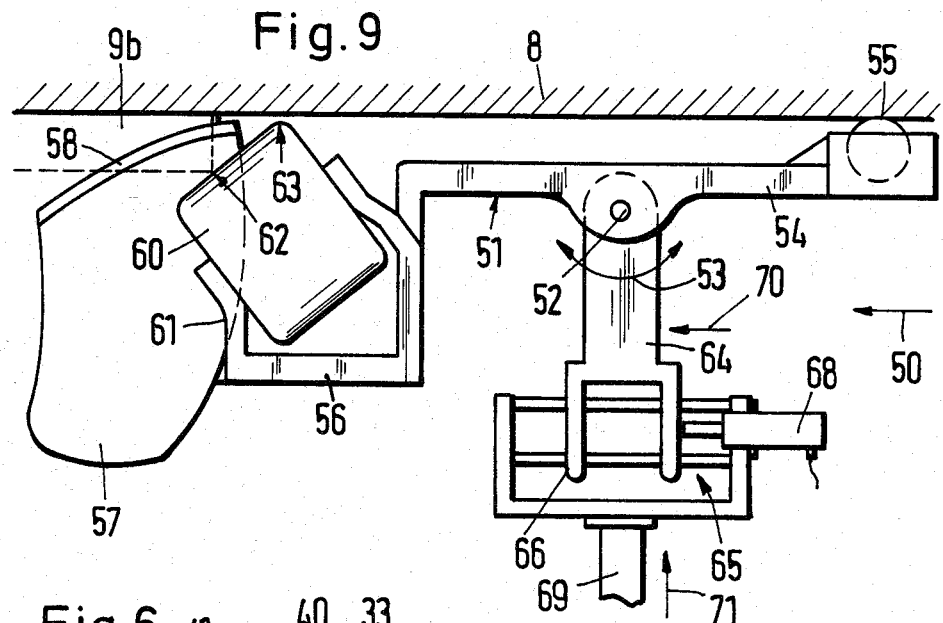
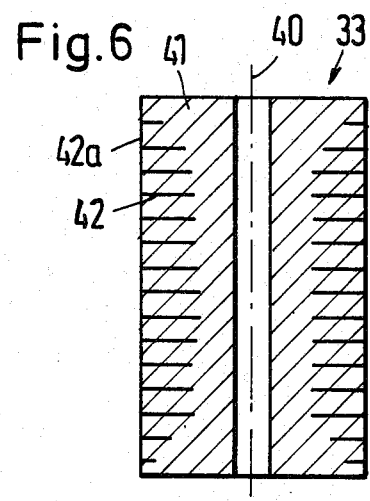
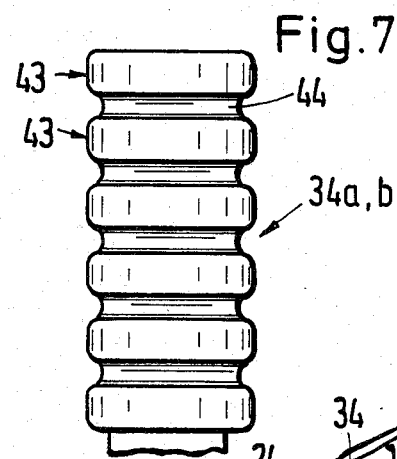
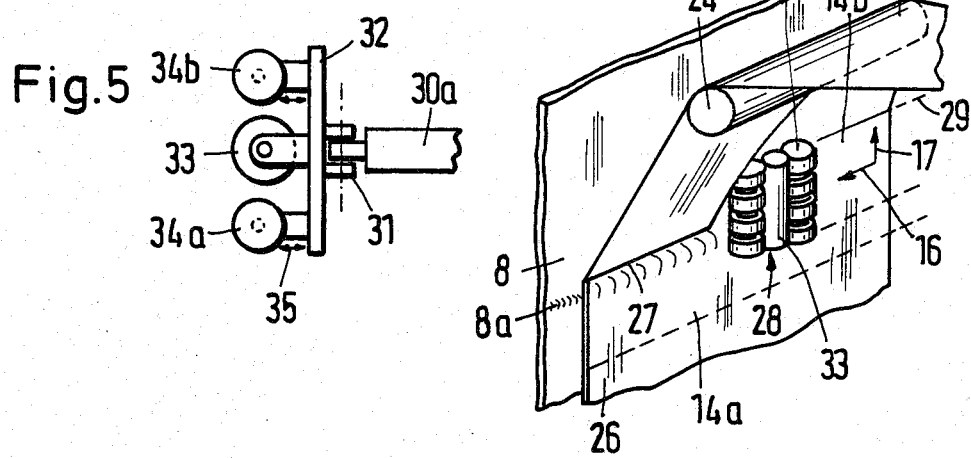

4,664,741

APPARATUS FOR AUTOMATICALLY APPLYING AND PRESSING WEBS OF RUBBER OR SIMILAR LINING MATERIAL TO AND AGAINST EXPANDED WALL SURFACES

FIELD OF THE INVENTION

This invention relates to an apparatus for automatically applying webs of rubber or similar lining material of predetermined width and length to expanded wall surfaces, particularly of steel, in vessels, reactors, or the like and for automatically pressing said webs thereagainst.

BACKGROUND OF THE INVENTION

In various fields of application, a corrosion-proof lining, in particular of rubber or synthetic material, can be applied to the walls of vessels, reactors, or the like. Usually such lining material is manually laid on the respective surfaces.

For this purpose, the web-like lining material is cut to follow the wall height or length and is unrolled from top over the entire height of the wall surface when the walls to be lined are perpendicular.

Avoiding pockets of entrapped air, the web is then positioned adjacent to the surface and pressed thereagainst at a predetermined pressure. An overlap seam is formed with the adjacent web by a specific treatment. To this effect, the edge of the preceding web is obliquely cut and covered with an adhesive before the following web is strongly pressed thereagainst. Any portion projecting over said overlap seam requires a finishing treatment.

These steps and treatments are labor intensive and extremely tiring. Consequently, it cannot be guaranteed that the lining material is uniformly pressed against the surface and thus, the need for uniform bond strength is not satisfied. Moreover, such treatments are extraordinarily time-consuming.

OBJECT OF THE INVENTION

It is an object of the present invention to provide an apparatus with the aid of which expanded surfaces may be lined by means of such webs even more quickly and above all more reliably than has hitherto been the case.

SUMMARY OF THE INVENTION

The invention provides a guide frame corresponding to the length and width of the web materaial for a carriage which is movable in the one longitudinal direction of said guide frame at a predetermined rate, with said carriage comprising the supply stock and an unwinding and web-guiding means, a position and press head for said web material, which is adapted to be reciprocated transversely to said guide frame at a rate adapted to the carriage motion, a means for obliquely cutting edges and an adhesive applicator mounted on the one face side of said carriage and a same pressing and finishing means mounted on the other face side thereof.

The apparatus may be employed when the walls are horizontal, inclined or perpendicular and permits a continuous application of the web, with any distortions and pockets of entrapped air being avoided and an optimum and uniform pressing of the webs against the surface coated with an adhesive being guaranteed. Subassemblies of the apparatus may be easily inserted into the interior of vessels or reactors through corresponding manholes, where the components are assembled for operation. The apparatus may be easily shifted step by step along the surface to be lined according to the webs to be positioned side by side. It is also easy to align the apparatus relative to the extension of the surface to be lined and fix the apparatus in the aligned position.

Compared with the hand application of lining material to vertical surfaces, the webs are successively and automatically applied from bottom to top in such a manner that any pockets of entrapped air or the like are excluded and any irregularities, even such abrupt ones as welds or the like, are reliably compensated for and that even in areas including such irregularities the webs are permitted to be safely urged against the surface to be lined, offering a uniform bond strength over the entire wall surface. The application of the webs to the wall surface is accomplished simultaneously with the preparation of the open longitudinal edge which will form the seam overlapping the following web and the formation and finishing of the seam overlapping the preceding web. Hence, no additional steps are required and any additional time expenditure is reliably avoided.

Depending on the length or height of the surface to be covered and the length of the web, the guide frame may be easily adapted to the desired requirements and thus, in any case, the webs are laid on the surface step by step in one continuous working cycle for each web, with a manual finishing treatment being merely required at the ends of the webs and in the transition zones between surfaces of different inclination.

To ensure a bubble-free reliable assembly of webs of rubber or the like to surfaces, the positioning and pressing head is of particular importance. Consequently, it will be possible to independently also employ this head where the lining web is supplied separately from the apparatus and in a fashion inclined toward the surface to be lined and where the web is given a sloping edge or where the overlap seam is closed and finished by means of separate devices or in separate steps.

In accordance with the invention, such apparatus are therefore provided with an independent positioning and pressing head. This head is characterized by the feature that it is adapted to be reciprocated transversely to the web material along a carriage which is movable in the longitudinal direction of the web material and by the feature, that it includes a resilient pressing means for a roller holder comprising a center press roller which is adapted to be pressed against the wall to be lined at a predetermined force and the axis of rotation of which is approximately parallel to the carriage feed direction and further comprising a position roller to position the web material supplied in an inclined fashion with respect to the wall adjacent to the wall surface and to stroke therealong, with said position roller being situated in front of said press roller in every direction of position and press head movement and with said position roller being supported in a resiliently flexible fashion with respect to said holder and with respect to said press roller. The forward position roller engages the obliquely supplied web material and puts the web loosely and uniformly and progressively against the surface to be lined, with said position roller preferably including a shell surface contoured so as to directly engage the web material only in strip-like areas spaced apart from each other. Due to this fact, any air entrapped under the web material is reliably and safely rejected in a lateral movement. After the material has been placed, said press roller is urged against the positioned web with a predetermined constant force so that the web material sticks to the wall surface thereunder at the required bond strength.

A cylindrical roller of rubber or similar material preferably forms said press roller including spaced circumferential recesses and consequently, the outer circumference of said roller of rubber consists of successive disk-like areas.

An extraordinary latitude in adapting the press roller circumference to any irregularity found on the surface is thus achieved and hence, an excellent uniform bond strength at all points of the lining independent of such irregularities is acquired. With the exception of the points of inversion situated along the longitudinal web edges, the positioning and pressing head continuously and uniformly follows the surface to be lined in both the longitudinal direction of the web and transversely thereto, which means, along a zig-zag path, with the individual path sections defining a small angle thereinbetween. At the end of each path section and prior to reversing the motion, it is advantageous if the press head is brought into a newly aligned position in which the roller axes are aligned accurately perpendicular to the next path section to be followed in the transverse direction of the web. Hence, any crowding of the material is avoided as the rollers accurately travel along the web surface.

BRIEF DESCRIPTION OF THE DRAWING

The present invention will hereinafter be described in greater detail in conjunction with one embodiment with reference to a schematic drawing, in which

FIG. 4 depicts in perspective, the roller set of the positioning and pressing head according to the invention when in a use position;

FIG. 5 is a top view of the roller carrier of the positioning and pressing head;

FIG. 6 depicts in vertical section the pressing roller of the roller set;

FIG. 7 shows a side view of the positioning roller of the roller set;

FIG. 9 is a plan view of the means for obliquely cutting the edges, in its working position.

SPECIFIC DESCRIPTION

The apparatus is mainly used for lining surfaces provided in the interior of vessels, apparatus or the like. Consequently, to permit the apparatus to be inserted into the interior of the vessel through a conventional manhole or access opening, both assembly and disassembly of the apparatus must be easy. Moreover, the apparatus should be easily adaptable to surfaces of various lengths.

Figure 1:
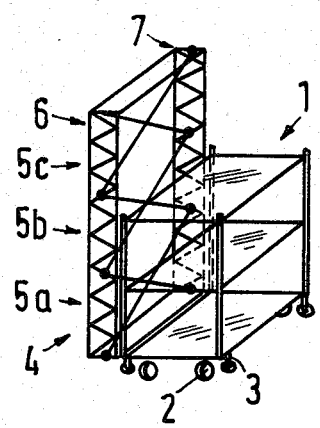
FIG. 1 is a perspective view of the guide frame employed in an apparatus according to the invention.

FIG. 1 shows a conventional wheeled ground-engaging and easily mountable erecting frame 1 comprising carrying rollers and lowerable engaging elements, pressure medium cylinders being, for instance, associated therewith preferably for alignment. A guide frame 4 is rigidly attached to said easily movable wheeled ground-engaging erecting frame. In the embodiment depicted in FIG. 1 it is assumed that the apparatus is used for lining perpendicular walls. The guide frame is composed of separate rigid frame portions 5a, 5b, 5c stiff against torsion and of different lengths, which may be interchanged and replaced by portions of the same kind and of different lengths and which may be easily attached so as to be in alignment with each other.

Hence, is not difficult to adapt said guide frame to surfaces of different lengths or heights. Guide rails are mounted on both front side edges of said guide frame 4, with the slide and guide rollers of a carriage or slide extending transversely to said guide frame engaging said guide rails.

Furthermore, rack portions are provided at the front face edges 6 and 7 which complement each other to form a rack extending over the entire respective length of said guide frame. Pinions of a drive mounted on the carriage are in engagement with this rack. A means for accommodating the carriage upon failure of the drive energy may also cooperate with said racks.

Figure 2:
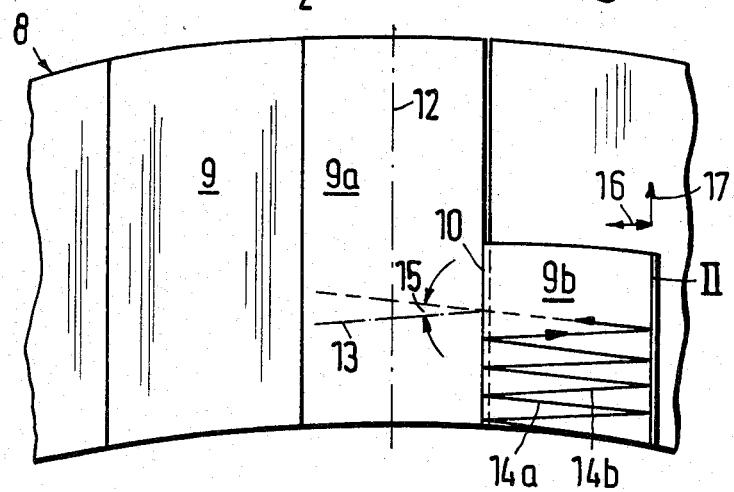
FIG. 2 shows a wall portion to be lined with the web material, the wall having either been partly or completely covered with the lining material.

The carriage has not been illustrated. Via the drive, said carriage may be caused to travel from bottom to top at a preset rate to accomplish one working cycle and may be returned downwards to its initial position at a corresponding higher rate. The carriage includes a longitudinally extending, double-thread spindle for a positioning and pressing head adapted to be reciprocated in the longitudinal direction of the carriage, with said spindle being coupled with said drive via a clutch means. The two rates are adapted to each other so as to permit the position and press head—in performing its working cycle according to the embodiment shown—to perpendicularly move from bottom to top along a tight zig-zag path, the sections 14a, 14b of which are illustrated in FIG. 2.

The two driving directions are indicated by arrows 16 and 17. FIG. 2 depicts a portion of the steel wall 8 of a vessel to be lined, for instance, of a circular container. 9 and 9a designate lining webs of rubber that have already been laid on the wall.

The broken line 12 designates the longitudinal center line of the webs that have already been applied, whereas a reference line extending transversely to said longitudinal center line is indicated by 13. Path sections 14a, 14b and reference line 13 define an angle 15 amounting from 1° to 10°, in the embodiment shown, angle 15 amounts to 2.5°.

The carriage that has not illustrated, further includes a mounting arrangement for a reel on which the web of rubber pre-cut to its final length and a separation web of cloth or foil are wound. While the web is unwound, the release or separation web is coiled round a roller. The web of rubber separated from said release web moves via a guide roller 24 (FIG. 4) holding said web 23 at a spaced relationship to the surface 8 to be lined and above the roller set 28 of said positioning and pressing head.

To enable application of the web, said carriage has been moved downwards along guide frame 4. The material web is unwound from the supply reel until its front edge somewhat projects over the bottom edge of wall 8 to be lined. Prior to this unwinding process, engaging elements 3 have been released and guide frame 4 and wheeled, ground-engaging erecting frame 1 have been laterally shifted via rollers 2 from the position in front of web 9a and have been aligned with wall 8 and with the exposed edge of web 9a. Wheeled erecting frame 1 is then fixed through its engaging elements 3 and guide frame 4 is directly tightened to the steel wall 8 to be lined with the aid of upper electromagnetic tightening means that have not been illustrated.

Positioning and pressing head 28 approximately located in the center position of the carriage is then advanced from its withdrawn rest position into its working position towards the wall to be lined, afterwards the drive is switched on. Following zig-zag path 14a, 14b, the web is then progressively and alternately from left to right and from right to left brought into positive engagement with the surface of wall 8 to be lined by means of the positioning and pressing head rollers, with web portion 25 obliquely extending relative to wall 8 being successively urged against said wall by the rollers. FIG. 4 shows the upper edge 27 of the web to be positioned and pressed by roller set 28 during the preceding path section followed from left to right. 26 designates the web portion that has already been applied to the wall and pressed thereagainst. In FIG. 4 the roller set 28 is moving along a path section from right to left. Behind said roller set 28, a new edge 29 is formed at a higher level between said portion 26 already pressed against the wall surface and the obliquely supplied web portion 25.

The roller set includes a center press roller 33 rigidly supported by a roller holder 32. Roller 33 is formed of a cylindrical solid rubber body 41 having a center bore 41 for accommodating the rotatable shaft. Recesses 42 of predetermined and largely constant depths are cut into the rubber roller from the circumference thereof at predetermined distances from the axis, the depths of said recesses successively decreasing merely towards the face sides of said roller 33, as indicated by 42a. The depth of said recesses may, for instance, range from 8 to 12 mm when measured from the circumference. The fine recesses or cuts subdivide said cylindrical rubber body into a series of disk-like portions directly resting on each other.

This type of design permits the press roller 33 circumference to be very accurately adapted to even more abrupt surface structures of the wall to be lined such as, for instance, weld 8a shown in FIG. 4, and thus allows the pressure exerted upon axis 40 of roller 33 to be uniformly transmitted from the circumferential surface of said roller 33 to the web of rubber, the circumferential surface being nonetheless accurately adapted to all irregularities and the pressing of the web against the surface including such irregularities being guaranteed as well.

In the direction of movement along path sections 14a, 14b one position roller 34a, 34b each travels in front of said press roller 33. Said position rollers are also supported by roller holder 32 on the same axis, support of said position rollers, however, being not effected in a rigid fashion as in the case of press roller 33 but in a way as to be resiliently flexible, as indicated by arrow 35, so that the pressure exerted upon the web by said position rollers is relatively small, however, sufficient to progressively urge web portion 25 from its inclined position when supplied against the surface of wall 8, as illustrated in FIG. 4.

Each position roller is formed of a relatively rigid cylinder member, for instance, of synthetic material, however, including uniformly spaced annular grooves 44 of considerable width and thus, the cylinder surface of said roller actually only comprises annular lands 43. This type of position roller design is advantageous because the pressure exerted when the web is positioned, is applied to the rubber material in a strip-like manner only and consequently, areas remain between the surface of wall 8 and the web of rubber along which the entrapped air is safely ejected in a lateral movement, under the influence of said position rollers. Hence, said press roller 33 only has to apply the pressure required to obtain the desired bond strength.

Figure 8:
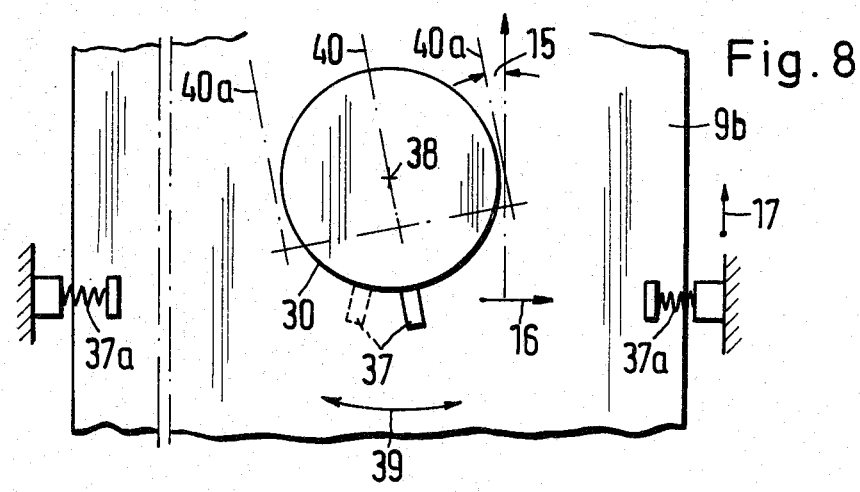
FIG. 8 shows, when viewed in a direction perpendicular to the wall to be lined, the cylinder case of a pressure medium cylinder which is part of the positioning and pressing head including pertinent members.

Roller holder 32 is attached to the piston rod 30a of an air pressure cylinder so as to be pivotable about an axis approximately parallel to the transverse reference line 31, cylinder case 30 of said air pressure cylinder being shown in FIG. 8.

This pneumatic cylinder is part of said the positioning and pressing head and is reciprocated along the carriage, as indicated by arrow 16, at a predetermined rate. In the case of the pneumatic cylinder depicted in the embodiment, the piston is moved in the cylinder case 30 in a fashion free from all sealings and consequently, compressed air is permitted to permanently escape from said cylinder case in a manner that a horizontal characteristic curve indicative of the pressure applied to said roller holder 32 by the cylinder is obtained. Piston and/or piston rod 30a are moved in said cylinder case 30 so as to be prevented from rotation. Cylinder case 30 is secured to said position and press head so as to be rotatable about its longitudinal axis 38. Rotational movement is restricted to a predetermined angle by means of stops and catches.

Cylinder rotation about its longitudinal axis is accomplished via an actuating arm 37 and flexible stops 37a disposed on the carriage at the ends of path sections 14a, 14b. The assembly is such that the roller axes define a small angle of preferably approximately 2.5° relative to the longitudinal center line 12 in a way as to allow said roller axes 40, 40a to be perpendicular to each path section 14a, 14b. At the end of each path section, the inclination of holder 32 is automatically inverted, as indicated by the pivoting movement (arrow 39) of said cylinder case 30. Angles 15 according to FIG. 2 and FIG. 8 are selected such that, in dependence upon the feed motion 17 of the carriage, the distance of said carriage in the direction of movement 17 according to FIG. 2 during a transversal movement 14a and 14b respectively, of said position and press head is equal to or smaller than the axial length of said press roller 33.

Angles 15 shown in FIG. 2 and FIG. 8 also result therefrom. Path sections 14a, 14b depicted in FIG. 2 are also shown in FIG. 4 with respect to roller set 28.

Accomplishing the upward movement of the carriage along guide frame 4 simultaneously and independently also causes the formation of overlap seam 10 and its finishing treatment as well as the preparation of the open longitudinal edge of web 9b which will form the next overlap seam.

Figure 3:
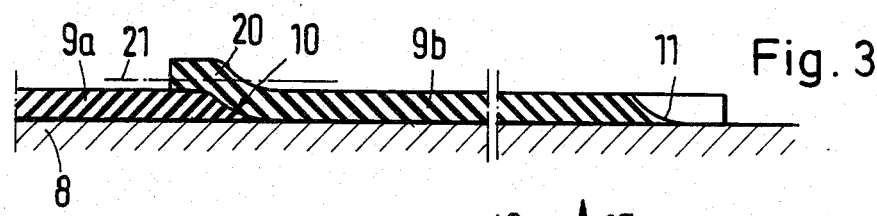
FIG. 3 is an enlarged cross-section of the overlap seam between adjacent webs.

As indicated by 11 in FIG. 3 the open longitudinal edge of web material 9b is obliquely cut toward the surface of wall 8 as the carriage moves upwards. To this effect, a means for obliquely cutting the edges is mounted on the right side of the carriage according to FIG. 2. Said means includes a cylinder, preferably a pneumatic one, secured to the carriage and capable of urging said means for obliquely cutting the edges from a rest position against the surface of the wall 8 to be lined at a predetermined biasing force. FIG. 9 shows the piston rod 69 of said pneumatic cylinder, whereas arrow 71 indicates the positioning and biasing direction. At the end of said piston rod 69 there is provided a transverse guide means 65 for a carriage-type fork 66 of a carrier arm 64 which may be biased on said guide means toward the open edge 11 of web 9b by means of a pneumatic cylinder 68 and at a defined pressure.

The means for obliquely cutting the edges further includes a rocker-type supporting member 51 mounted at the end of carrier arm 64 so as to be pivotable about an axis (the direction of pivoting movement is indicated by arrow 53) extending parallel to said longitudinal edge 11. Arm 54 facing away from said edge is provided at its end, with an engaging member, such as engaging ball 55, poor in friction and brought into contact with the inner surface of wall 8. Further arm 56 includes a movable unit comprising a blade 57 and a tracing roller 60. Blade 57 is rigidly attached to said arm and has an oblique cutting edge 58 corresponding to the cutting line 11, with said cutting edge being slightly convexly bent in the cutting direction to accomplish a cut along the open small face of said web 9b, with said cut tangentially extending toward the surface of wall 8.

Tracing roller 60 is used for accurately guiding cutting edge 58, the rotational axis 61 of said tracing roller 60 being obliquely positioned relative to the surface of wall 8 in a way as to permit the circumference of said tracing roller to be brought into contact with edge 62 of the small face of web 9b facing away from the surface of wall 8 while its own circumferential edge 63 is simultaneously brought into contact with the surface of wall 8.

This type of combined biasing forces acting according to arrows 70, 71 permits the roller to permanently be in intimate contact at both reference points 62, 63 and thus, the face side of web 9b is obliquely cut in the course of the forward movement of the carriage along the guide frame 4.

Above said means for obliquely cutting the edges 50 a press roller may be attached to the carriage for additionally urging, for instance, by means of a pneumatic cylinder, said open edge of web 9b once more against the surface of wall 8 at a predetermined force before the edge is obliquely cut.

Furthermore, downstream of said means for obliquely cutting the edges another means may be mounted on the carriage for applying an adhesive or the like to the newly cut edge in the course of carriage movement.

While applying web 9b to the wall, overlap seam 10 is formed between the other longitudinal edge of said web and the open, obliquely cut longitudinal edge of web 9a previously applied to the wall.

To this effect, a press roller provided on the other end of the carriage is adapted to be positioned against the overlapping edge portions of the two webs by means of a pneumatic cylinder, for instance, to again press said overlapped portions at a predetermined pressing force into mutual engagement and to thus provide for a reliable connection between the two overlapping edge portions of the webs.

Downstream of said press roller, a finishing means including a cutting edge may be provided, said cutting edge being adjusted via guide rollers travelling along both webs 9a, 9b in such a manner that a cut 21 (FIG. 3) is accomplished along said overlap seam in a fashon parallel to the surface of said webs, with the cutting plane either coinciding with the surface of the webs or being slightly, for instance, approximately 1 mm, spaced apart from the surface of said webs. Any material projecting over said overlap seam being reliably removed in this finishing process.

The cutting edges of the cutting means provided on both ends of the carriage may be conventionally heated. After the web has been laid on the wall surface, the carriage is rapidly moved downwards in case of the illustrated embodiment of lining perpendicular walls, prior to this downward movement, all members mounted on the carriage are to be withdrawn. The empty reel and the reel round which said release web material has been wound are removed and a new material supply reel is inserted.

After said tightening means have been released, said guide frame 4 is shifted along the surface to be lined according to the width of one material web, is aligned with the longitudinal edge of the previously applied web and with the surface to be lined and is fixed again so that the next application cycle may be started without delay as has been described hereinbefore in more detail.

We claim:

1. An apparatus for automatically applying a web of rubber as a lining to an upright wall surface, said apparatus comprising:
    a mobile guide frame juxtaposable with said wall surface;
    web-guiding means on said frame for feeding said web continuously into juxtaposition with said wall surface for adhesive bonding thereto as said web-guiding means is displaced on said frame in a direction so as to cover a strip of said wall surface with said web;
    a positioning and pressing head on said frame displaceable back and forth across said web on said frame transverse to said direction and at a rate enabling said head to advance in said direction, said head having at least one roller rotatable about an axis extending generally in said direction, and means for pressing said roller against said web and said web against said strip of said wall surface to bond said web thereto; and
    cutting means mounted on said frame for movement in said direction together with said advance for obliquely cutting a free edge of said web as it is adhesively bonded to said strip of said wall surface, thereby enabling a web adapted to be applied to an adjacent strip to overlap the adhesively bonded web, said mobile guide frame being shiftable into juxtaposition with said adjacent strip upon completion of lining of the first-mentioned strip.

2. The apparatus defined in claim 1 wherein said guide frame comprises a plurality of interchangeable frame portions of graded lengths mounted in alignment in said direction, said frame portions defining edges along which racks can be provided enabling the displacement of said web and guiding means, said head and said cutting means in said direction.

3. The apparatus defined in claim 1 wherein said positioning and pressing head is provided with means enabling its displacement back and forth across said web transverse to said direction in a zig-zag path with the back-and-forth movements including an angle between 1° and 10°.

4. The apparatus defined in claim 1 wherein said cutting means includes a guide roller for tracing an edge of the web applied to the first-mentioned strip and turned away from said wall surface, and a cutting blade connected with said guide roller for control thereby.

5. The apparatus defined in claim 4 wherein said cutting blade has a convex curvature so that the oblique cut of said free edge of said web is outwardly convex.

6. The apparatus defined in claim 4 wherein said cutting means comprises a rocker carrying said guide roller and said blade on one arm of said rocker and a low-friction member bearing on said wall surface connected to another arm of said rocker.

7. The apparatus defined in claim 1 wherein said web-guiding means is located on said frame above said head.

8. The apparatus defined in claim 1 wherein said head comprises a roller holder, a fluid-operated cylinder connected to said holder for displacing same against said web to press said web against said surface, a central pressing roller journaled on said holder about an axis extending generally in said direction, adapted to bear upon said web, and a pair of positioning rollers journaled on said holder flanking said pressing roller and rotatable about respective axes generally parallel to the axis of said pressing roller.

9. The apparatus defined in claim 8 wherein each of said positioning rollers has a roller body formed with axially spaced outwardly open annular circumferential grooves.

10. The apparatus defined in claim 8 wherein said pressing roller is a cylindrical roller formed with annular slits in an axially spaced relationship therealong.

11. The apparatus defined in claim 8, further comprising means for swinging said holder upon determination of travel back and forth to til said axes alternately in opposite directions with respect to said direction of advance so that during the back-and-forth movement of said head, said axes assume angles of 1° to 10° with respect to the direction of advance.

* * * * *